(12) United States Patent
Yeh

(10) Patent No.: US 6,432,504 B1
(45) Date of Patent: Aug. 13, 2002

(54) COMPOSITE TEXTILE FABRIC HAVING MOISTURE MANAGEMENT

(76) Inventor: Patrick Yeh, No. 41, Lane 328, Li Shan St., Taipei City (TW)

( * ) Notice: Subject to any disclaimer, the term of this patent is extended or adjusted under 35 U.S.C. 154(b) by 0 days.

(21) Appl. No.: 09/547,333

(22) Filed: Apr. 11, 2000

Related U.S. Application Data

(63) Continuation-in-part of application No. 09/097,926, filed on Jun. 16, 1998, now abandoned.

(51) Int. Cl.$^7$ .............................. B32B 5/08; D03D 11/00
(52) U.S. Cl. ........................... 428/85; 428/903; 428/91; 442/239; 442/312
(58) Field of Search ................................. 442/239, 301, 442/312, 318; 428/903, 85, 91

(56) References Cited

U.S. PATENT DOCUMENTS

| | | | | |
|---|---|---|---|---|
| 4,733,546 A | * | 3/1988 | Toda | 66/202 |
| 4,830,907 A | * | 5/1989 | Sawyer et al. | 442/301 |
| 5,217,782 A | * | 6/1993 | Moretz et al. | 428/91 |
| 5,306,536 A | * | 4/1994 | Moretz et al. | 442/318 |
| 5,344,698 A | * | 9/1994 | Rock et al. | 442/312 |
| 5,364,678 A | * | 11/1994 | Lumb et al. | 442/301 |

OTHER PUBLICATIONS http://www.calgolf.com/cgc jackets.htm.
California Golf Company–Apparel–The Highest Quality Apparel From Winner Mate.
http://www.asiaonline.net.hk/amery/textiles10.htm.
Amery Textiles Ltd–10: Acetate Satin, Nylon/Polyester Two–Tone, Nylon Dobby, Nylon Oxford, Nylon Rip–Stop, Nylon Stain, Nylon Taffeta, Nylon Taslan, Nylon Trilobal, T/C chintz, T/C Poplin, Polyester Micro–Fabric, Polyester Taffeta A–Grade.
http://www.pak.com/lotus/garment.html.
Lotus Textiles—Garment Fabrics.
http://www.charterhouse—holdings.co.uk/kustomkit/shirt-s.html.
Kustom Kit—Woven Shirt Range.
http://www.asiamart.net/teskorea.htm.
AsiaMart–Product Showcase–TexKorea Fabrics.
http://daekwang.texcom.co.kr/product.htm.
Products–Procuct.
http://www.angelfire.com/il/brosinternational.
Brothers International—Fabric Supplier.
http://www.textilenet.org.tw/citis/board/html/produc.
Products.
http://www.hiindia.com/yellowpg/docs/textile processing.htm.
Textile Processing.
http://sq.ink.yahoo.com/bin/query sq!p=peach+finish&hc=0&hs=0.
Yahoo! Singapore Search Result–peach finish.
http://textile–machinery.com.tw.
Chien Lun Machinery Co. Ltd—Horizontal Type 3–6 Level Sueding Maching.
"Textile Terms and Definitions".
Tenth Edition/The Textile Institute/pp. 114–115 188–189 and 332–333.
J P Pub (Kokai) No. 52–025168 Pat Abst, Feb. 1977.*

* cited by examiner

*Primary Examiner*—Daniel Zirker
(74) *Attorney, Agent, or Firm*—J.C. Patents

(57) ABSTRACT

A composite textile fabric for wicking moisture away from the skin of the wearer and transporting moisture from its skin-side surface to the opposite surface. The fabric includes a first fabric layer which has been rendered hydrophilic in order to quickly wick perspiration and other body fluids away from the skin of the user, and includes a relative high denier; and a second fabric layer which has been rendered hydrophilic, and includes filaments which is processed by peach finish sueding. The second filaments have a relatively low denier in order to pull perspiration and other body fluids from the first fabric layer.

17 Claims, 1 Drawing Sheet

COMPOSITE TEXTILE FABRIC HAVING MOISTURE MANAGEMENT

RELATED INVENTION

This is a continuation-in-part application of U.S. patent application Ser. No. 09/097,926, filed on Jun. 16, 1998, now abandoned, which is herein incorporated by reference.

BACKGROUND OF THE INVENTION

1. Field of the Invention

The invention relates in general to a composite textile fabric, and more particularly to a composite fabric for wicking moisture away from the skin of the wearer and transporting moisture from the skin-side surface to the opposite-side surface of the fabric.

2. Description of the Related Art

To facilitate absorption of the perspiration of the wearer, garments are preferably made of a textile fabric consisting of natural fiber such as cotton, silk or linen, or by a blend of natural and synthetic fibers. Such garments cannot quickly disperse the moisture away from the skin, though they can absorb perspiration from the skin. This kind of perspiration-absorbed garments require a period of time to evaporate moisture so that wearers will feel cold and clammy.

A multi-layer moisture management fabric is disclosed in an U.S. Pat. No. 5,217,782 dated Jun. 8, 1993 issued to Moretz et al. The multi-layer moisture management fabric includes a relatively thick inner moisture permeable hydrophobic fabric layer for being positioned next to the skin of the wearer of the garment, a first, relatively thin intermediate hydrophilic fabric layer positioned adjacent the hydrophobic fabric layer on the side thereof away from the skin of the wearer, and a second, relatively thick outer hydrophilic fabric layer positioned adjacent the first hydrophilic on the opposite side thereof from the hydrophobic fabric layer. Due to the hydrophobic and non-absorbent characteristics of the inner fabric layer, the multi-layer fabric is only suitable to be used to absorb a relatively large amount of fluid, like urine, and is unsuitable to efficiently and quickly wick a relatively small amount of fluid, like tiny drops of perspiration, away from the skin.

Japanese Patent Publication (Kokai) No. 52-25168 proposes an absorbent fabric having an intermediate layer of ultra-fine fibers of less than 0.7 denier covered with a surface layer of coarse fiber of more than 1 denier, in which the ratio of fineness between the two fibers is more than 4 and the fiber surfaces are processed by hydrophilic treatment. Though a wet feeling on the wearer skin can be avoided because the water is immediately removed from the skin through the surface layer, the water absorbed in the sheet cannot easily evaporate therefrom. On the other hand, the absorbent fabric lacks durability against abrasion, pilling, and acratching because the surface layer is composed of a yarn made from ultrafine fibers of less than 0.7 denier, which are easily damaged by external force applied to the fabric surface.

A knitted fabric for clothing is disclosed by Toda et. al. U.S. Pat. No. 4,733,546. This knitted fabric has a multi-layered structure made of non-hydroscopic fiber yarn, such as synthetic yarn. The inter-fiber space in a yarn composing an outer layer is smaller than that in a yarn composing a next-to-skin layer. Fibers which compose a yarn of the next to-skin layer having the fineness of more than 1 denier, especially in the range of 4 to 6 denier, are proposed. On the other hand, the next-to-skin layer fiber with a fineness of at least 1.5 times greater than the outer layer fiber is brought up. However, a fabric made of a fiber more than 3 denier is coarse. Therefore, the kind of fabric is not suitable for undergarment and nipped-in sportswear. Moreover, a next-to-skin layer made of fibers in the range of 4 to 6 denier can not absorb the perspiration from the skin efficiently due to large inter-fiber space. Moreover, in the present garment market, a large number of the garments are suffering from peeling and being hooked or snagged. As a result, it is now of great interest to develop a composite textile fabric with delicate texture, efficient perspiration absorbency from the skin and durability against external force for use in undergarment but without the problems of peeling and being hooked or snagged.

SUMMARY OF THE INVENTION

It is therefore an object of the invention to provide a composite textile fabric for use in undergarment to overcome the above-mentioned drawbacks of the previous inventions.

It is another object of the invention to provide a composite textile fabric, which includes a first fabric layer and a second fabric layer. The first fabric layer is a next-to-skin fabric layer and has a fineness of 3 denier or less than 3 denier, preferably 0.5 denier to 2.5 denier, in order to quickly wick perspiration and other fluids away from the skin of the user. The second fabric layer has a fineness of 0.1 denier to less than 1 denier, preferably 0.9 denier or less than 0.9 denier in order to pull perspiration and other fluid from the first fabric layer. The ratio of fineness, the first fabric layer to the second fabric layer, is at least 1.5.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1:
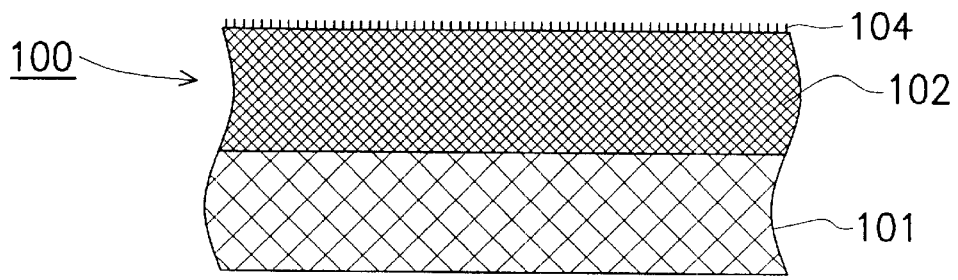
FIG. 1 is a schematically cross-sectional view of a composite textile fabric according to a preferred embodiment of the present invention.

A composite textile fabric 100 for an undergarment in accordance with the invention is illustrated in FIG. 1. The composite textile fabric 100 includes a first layer 101 and a second layer 102 positioned adjacent to the first layer 101. The second fabric layer 102 comprises a layer of orderly pile 104. The first and second fabric layers 102 and 102 are rendered hydrophilic by any suitable method the persons skilled in the art familiar with.

The first hydrophilic fabric layer 101 is intended to be next to and in contact with the skin of the garment wearer, or to be closer to the skin than the second hydrophilic fabric layer 102. The first hydrophilic fabric layer 101 may be knitted or woven with a yam 200, shown in FIG. 2, that is preferably comprised of synthetic fibers such as polyester, nylon, acrylic, recycled synthetic fiber, or the like. Since the first fabric layer 101 is rendered hydrophilic, the wicking of moisture such as perspiration, urine or other body fluids, from the skin next to the first fabric layer 101 is significantly enhanced.

Figure 3:
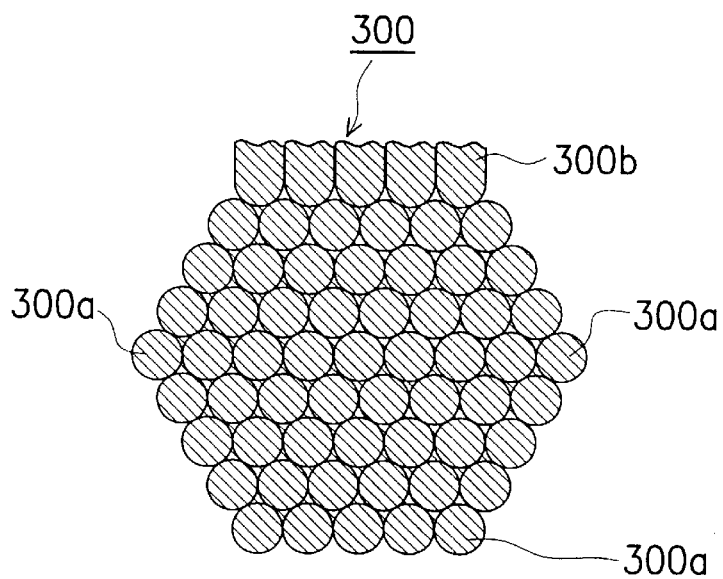
FIG. 3 is a schematically cross-sectional view of a yarn used to form a second fabric layer of the composite textile fabric of the present invention.

The second hydrophilic fabric layer 102 may be knitted or woven with a yarn 300, shown in FIG. 3, that is preferably comprised of synthetic fibers such as polyester, nylon, acrylic, recycled synthetic fiber, or the like. The first and the second hydrophilic fabric layers 101 and 102 may be formed integrally and concurrently by, for example, knitting or weaving. Although each fabric is shown to be distinct and separate, each of them is integrated with each other. As a result, the composite textile fabric functions as a single unit.

Figure 2:
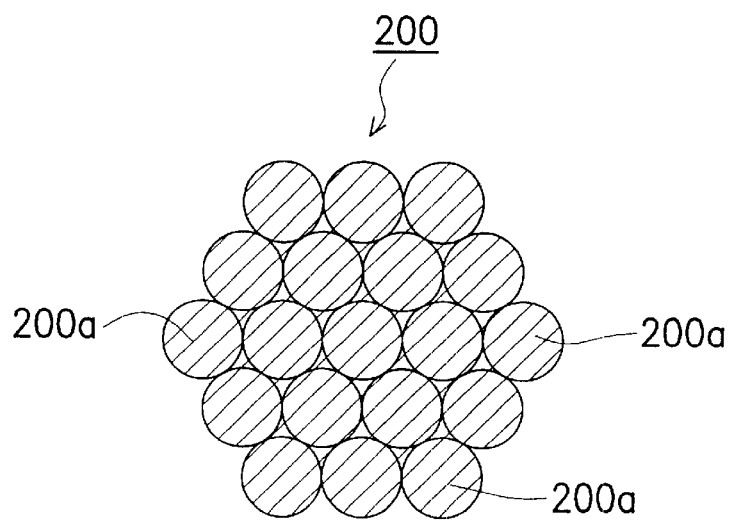
FIG. 2 is a schematically cross-sectional view of a yam used to form a first fabric layer of the composite textile fabric of the present invention.

Referring now to FIG. 2 and FIG. 3, the yarn 200 includes fibers 200a, preferably filaments, and the yarn 300 includes fibers 300a, preferably filaments since using spuns as fibers tends to occur peeling on the surface of the garment but using filaments as fibers overcomes peeling easily. However, to prevent the filaments 300a from being hooked or snagged from the surface of the fabric, the surface of the second layer 102 is preferably processed by peach treatment, which by the way makes the texture of the second layer 102 even better and even better than cotton. Peach sueding is performed by treating the surface of the fabric layer 102 with a grinding wheel or sueding rollers. Some filaments on the surface of the fabric layer 102 are broken by the grinding wheel or sueding rollers so that a layer of short piles 104 and 300b as shown in FIG. 1 and FIG. 3 respectively is formed. Peach treatment of the second layer further provides the following advantages: forming short piles 104, 300b, with almost consist length on the surface of the fabric to prevent filament from being hooked and snagged, preventing light scattering on the surface of the second layer so that the second layer is not synthetic-like, which can be easily accepted by the consumers, and increasing outward surface area, which contributes the second layer of lower denier to have a property of more easily evaporating. The filaments 300a of the second hydrophilic fabric layer 102 are preferably of greater fineness than the filaments 200a of the first hydrophilic fabric layer 101. The feature of fineness can be decided by the denier of the filaments. A composite textile fabric suitable for sportswear, especially worn next to skin, and undergarments should at least be able to absorb tiny perspiration from the skin but without clammy sensation, have delicate texture, and evaporate the perspiration rapidly. Therefore, the filaments 101 can be 3 denier or less than 3 denier, preferably 0.5 denier to 2.5 denier but the denier of the filament 101 is substantially larger than that of the filament 102. The filaments 102 can be in the range of 0.1 denier or larger than 0.1 denier to 1 denier (not including 1 denier), preferably 0.9 denier or less than 0.9 denier. The ratio of fineness is at least 1.5 ( filament 101/filament 102 ). This feature causes the second hydrophilic fabric layer 102 to have a stronger moisture absorbency than the first hydrophilic fabric layer 101. Therefore, the skin can be kept dry, which creates a dry and comfortable sensation to the wearer. Moreover, compared with the textile fabric disclosed by Toda et. al. U.S. Pat. No. 4,733,546, the textile fabric of the present invention provides stronger moisture absorbency more comfortable texture since the textile fabric disclosed by Toda et. al. is larger than 1 denier. Also, since the filaments 102 are preferably in the range of 0.1 denier to less than 1 denier, the filaments of the next to skin layer have a large variety of choices in size.

Due to the hydrophilic characteristic and the relatively strong absorbency of the second fabric layer 102, the perspiration absorbed in the second fabric layer 102 will be diffused over a relatively large area. Thus, the water contained in the perspiration retained by the second fabric layer 102 is evaporated into the exposed air in the large area, so that the composite textile fabric can become dry in a shorter period of time than conventional fabric do.

The following are examples having excellent performance as composite textile fabric for use in undergarments or sportswears.

EXAMPLE 1

A first hydrophilic fabric layer 101 includes filaments having a fineness of about 2 denier and a second hydrophilic fabric layer 102 includes filaments having a fineness of about 0.7 denier. Therefore, the ratio of fineness (filament 101/filament 102) is about 2.9, which contributes high capillary action from the first hydrophilic fabric layer 101 to the second hydrophilic fabric layer 102. Also, the texture of the next-to-skin layer is nice. The wearer will feel dry but without losing delicate touch. The second fabric is processed by peach finish sueding.

EXAMPLE 2

To satisfy even more strict requirement of texture touch, filaments of a first hydrophilic fabric layer 101 about 1 denier and filaments of a second hydrophilic fabric layer 102 about 0.5 denier are proposed. The second fabric 102 is processed by peach finish sueding. Therefore, the absorbency of perspiration from the skin to the first hydrophilic fabric layer 101 is even greater and the tough is even better than the conventional ones.

EXAMPLE 3

Another combination of composite textile fabric has greater absorbency and better texture. Filaments of a first hydrophilic fabric layer 101 are about 0.5 denier. Filaments of a second hydrophilic fabric layer 102 are about 0.1 denier. Consequently, the ratio of fineness is about 5. The tremendous increase of absorbency can be easily inferred by this number. The second fabric 102 is processed peach finish sueding.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A composite textile fabric comprising:
  a first fabric layer, wherein the first fabric layer is a next-to-skin fabric layer and the first fabric layer includes a plurality of first filaments, each of the first filaments having a fineness of 3 denier or less than 3 denier in order to quickly wick perspiration and other fluids away from the skin of the user; and
  a second fabric layer, wherein the second fabric layer includes a plurality of second filaments, wherein a portion of said second filaments facing towards outside forms a layer of an orderly pile, each of the second filaments having a fineness of 0.1 denier or larger than 0.1 denier to less than 1 denier in order to pull perspiration and other fluid from the first fabric layer, and wherein the denier of the first fabric layer is larger than the denier of the second fabric layer.

2. The composite textile fabric as claimed in claim 1, wherein the ratio of fineness of the first filaments to the second filaments is at least 1.5.

3. The composite textile fabric as claimed in claim 1, wherein the first filaments are about 0.5 denier to 2.5 denier.

4. The composite textile fabric as claimed in claim 1, wherein the second filaments are about 0.9 denier or less than 0.9 denier.

5. The composite textile fabric as claimed in claim 1, wherein the first and the second fabric layers are formed integrally and concurrently by knitting or weaving.

6. The composite textile fabric as claimed in claim 1, wherein the first fabric layer comprises a material selected from the synthetic fiber group consisting of polyester, nylon, acrylic, and recycled synthetic fiber.

7. The composite textile fabric as claimed in claim 1, wherein the second fabric layer comprises a material selected from the synthetic fiber group consisting of polyester, nylon, acrylic, and recycled synthetic fiber.

8. The composite textile fabric as claimed in claim 1, wherein the layer of an orderly pile is formed using a plurality of second filaments to form a fabric layer and then subjecting the fabric layer to a treatment to break a portion the second filaments.

9. The composite textile fabric as claimed in claim 1, wherein the layer of an orderly pile is formed using a plurality of second filaments to form a fabric layer and then subjecting the fabric layer to a peach finish sueding treatment to break a portion the second filaments.

10. A composite textile fabric comprising:
   a first fabric layer, wherein the first fabric layer is a next-to-skin fabric layer and the first fabric layer includes a plurality of first filaments, each of the first filaments having a fineness of 3 denier or less than 3 denier in order to quickly wick perspiration and other fluids away from the skin of the user; and
   a second fabric layer, wherein the second fabric layer include includes a plurality of second filaments, each of the second filaments having a fineness of 0.1 denier or larger than 0.1 denier to less than 1 denier in order to pull perspiration and other fluid from the first fabric layer, and wherein a portion of the second filaments facing towards outside forms a layer of an orderly pile, and wherein the denier of the first fabric layer is larger than the denier of the second fabric layer and the ratio of the fineness of the first filaments to the second filaments is at least 1.5.

11. The composite textile fabric as claimed in claim 10, wherein the first filaments are about 0.5 denier to 2.5 denier.

12. The composite textile fabric as claimed in claim 10, wherein the second filaments are about 0.9 denier or less than 0.9 denier.

13. The composite textile fabric as claimed in claim 10, wherein the first and the second fabric layers are formed integrally and concurrently by knitting or weaving.

14. The composite textile fabric as claimed in claim 10, wherein the first fabric layer comprises a material selected from the synthetic fiber group consisting of polyester, nylon, acrylic, and recycled synthetic fiber.

15. The composite textile fabric as claimed in claim 10, wherein the second fabric layer comprises a material selected from the synthetic fiber group consisting of polyester, nylon, acrylic, and recycled synthetic fiber.

16. The composite textile fabric as claimed in claim 10, wherein the layer of an orderly pile is formed using a plurality of second filaments to form a fabric layer and then subjecting the fabric layer to a treatment to break a portion the second filaments.

17. The composite textile fabric as claimed in claim 10, wherein the layer of an orderly pile is formed using a plurality of second filaments to form a fabric layer and then subjecting the fabric layer to a peach finish sueding treatment to break a portion the second filaments.

\* \* \* \* \*